(12) United States Patent
Kawatsu et al.

(10) Patent No.: US 8,215,469 B2
(45) Date of Patent: Jul. 10, 2012

(54) MULTIPLE DISK CLUTCH

(75) Inventors: Hirotaka Kawatsu, Wako (JP);
Yoshitsugu Gokan, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 961 days.

(21) Appl. No.: 12/235,422

(22) Filed: Sep. 22, 2008

(65) Prior Publication Data
US 2009/0078526 A1  Mar. 26, 2009

(30) Foreign Application Priority Data
Sep. 26, 2007 (JP) ................................ 2007-249879

(51) Int. Cl.
*F16D 43/21* (2006.01)
*F16D 13/54* (2006.01)
*F16D 13/72* (2006.01)

(52) U.S. Cl. .................. 192/54.5; 192/30 V; 192/70.23; 192/70.12; 192/113.23

(58) Field of Classification Search ................ 192/30 V, 192/54.5, 55.1, 56.6, 70.23, 70.12, 113.23, 192/113.26; 74/443, 574.4
See application file for complete search history.

(56) References Cited

U.S. PATENT DOCUMENTS

| | | | | |
|---|---|---|---|---|
| 3,205,989 A | * | 9/1965 | Mantey | 192/84.941 |
| 4,557,360 A | * | 12/1985 | Kumatani | 192/30 V |
| 5,617,938 A | | 4/1997 | Tsukada et al. | |
| 7,191,882 B2 | * | 3/2007 | Kataoka et al. | 192/54.5 |
| 7,437,808 B2 | * | 10/2008 | Hodjat | 29/4.51 |
| 8,025,138 B2 | * | 9/2011 | Yoshinaga et al. | 192/54.5 |
| 2008/0029332 A1 | * | 2/2008 | Gokan et al. | 180/383 |

FOREIGN PATENT DOCUMENTS

| | | |
|---|---|---|
| CN | 2547943 | 4/2003 |
| CN | 1648482 | 8/2005 |
| DE | 19536424 | 4/1996 |
| DE | 10205766 | 8/2003 |
| JP | 58000634 | * 6/1981 |
| JP | 11-030248 | 2/1999 |
| JP | 2005-325993 | 11/2005 |

OTHER PUBLICATIONS

Chinese Office Action for corresponding CN Application No. 200810161031.X, May 31, 2010.

* cited by examiner

*Primary Examiner* — David D Le
*Assistant Examiner* — Huan Le
(74) *Attorney, Agent, or Firm* — Ditthavong Mori & Steiner, P.C.

(57) ABSTRACT

A multiple disk clutch includes a clutch outer, a clutch inner, frictional disks, a cam mechanism, and a vibration isolating member. The clutch inner is provided inside the clutch outer and configured to transmit a rotational driving force from the clutch outer to a transmission shaft. The frictional disks are movable in an axial direction of the transmission shaft to thereby make and break transmission of the rotational driving force from the clutch outer to the clutch inner. The cam mechanism is provided inside the clutch outer and configured to apply a pressing force to the frictional disks according to the rotational driving force from the crankshaft. The cam mechanism is configured to relax the pressing force applied to the frictional disks when a load from the transmission shaft exceeds a predetermined value. The vibration isolating member is provided at the clutch inner.

10 Claims, 10 Drawing Sheets

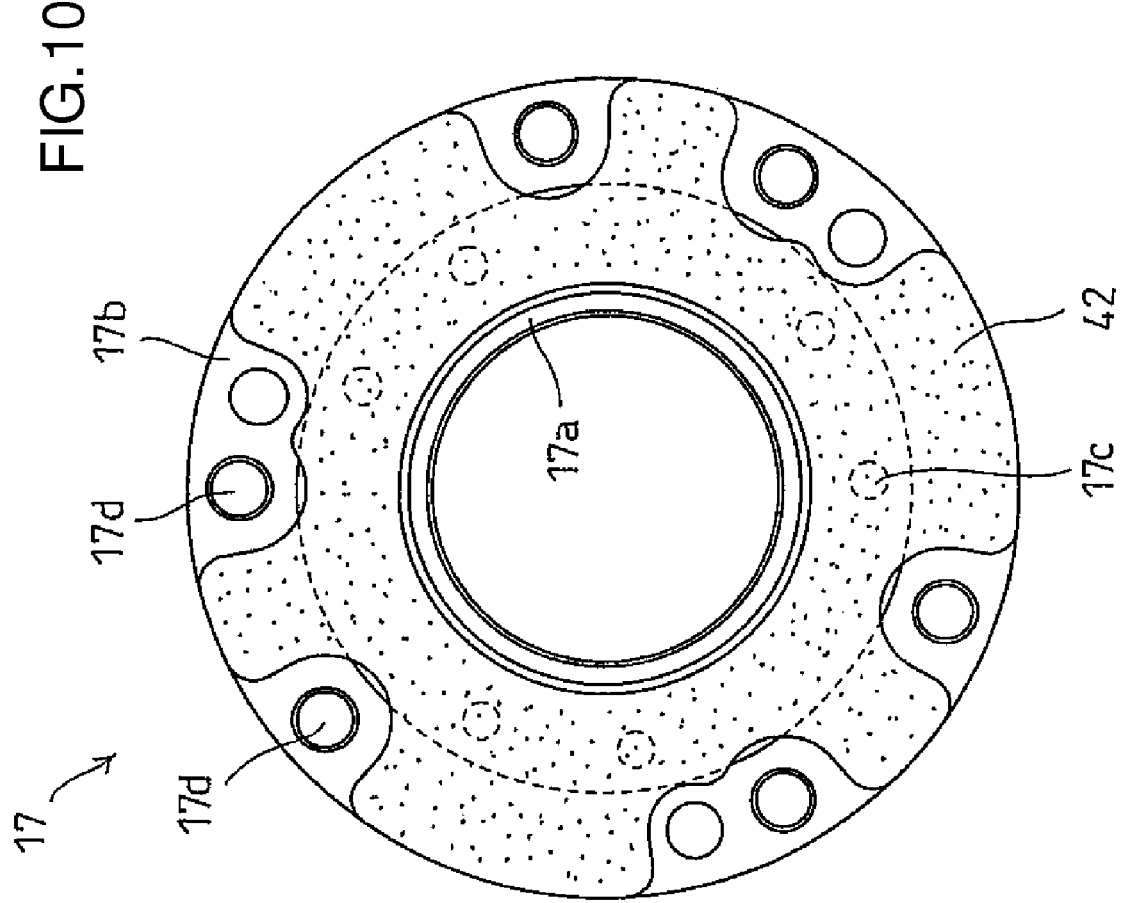

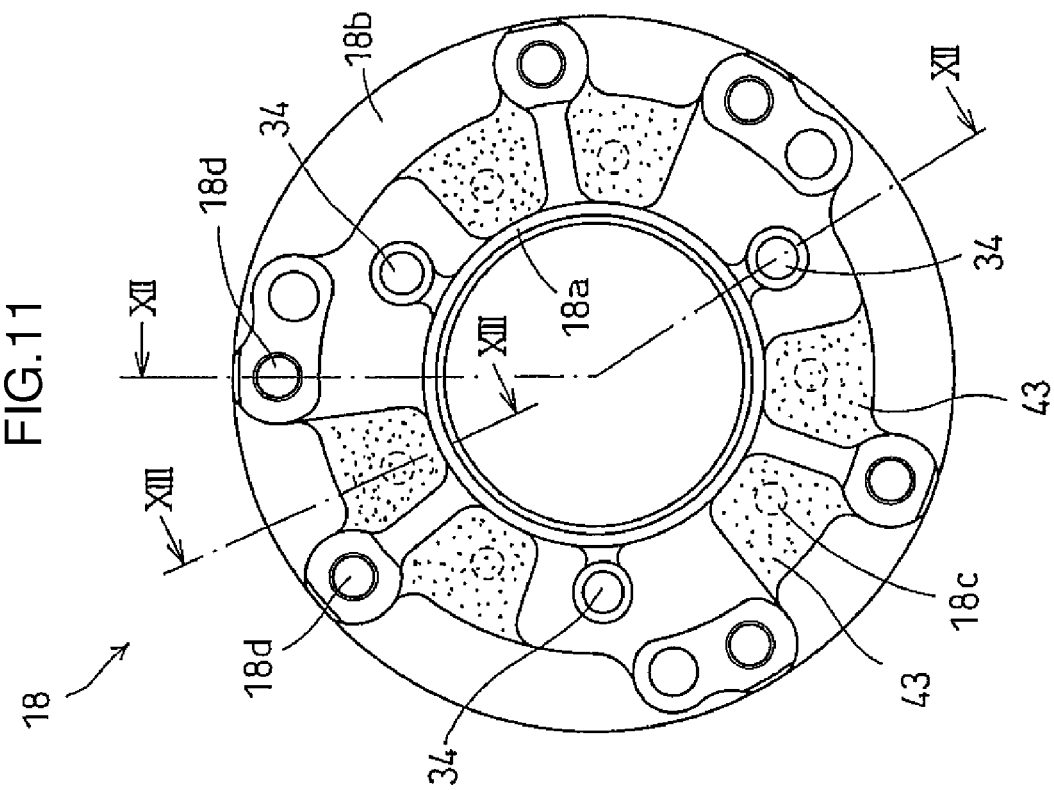
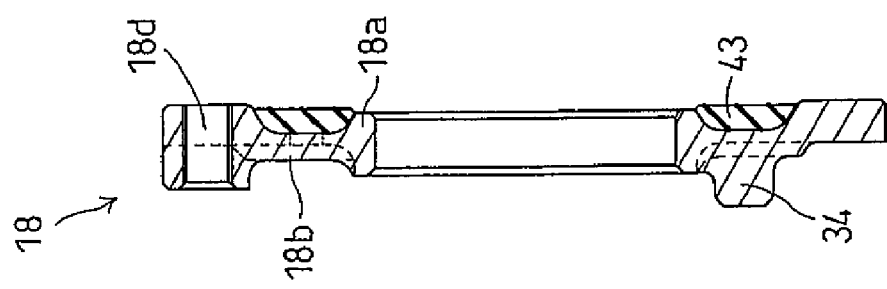
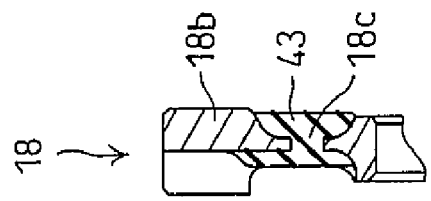

MULTIPLE DISK CLUTCH

CROSS-REFERENCE TO RELATED APPLICATIONS

The present application claims priority under 35 U.S.C. §119 to Japanese Patent Application No. 2007-249879, filed Sep. 26, 2007. The contents of this application are incorporated herein by reference in their entirety.

BACKGROUND OF THE INVENTION

1. Field of the Invention

The present invention relates to a multiple disk clutch.

2. Discussion of the Background

A system has been known in which a clutch for making and breaking transmission of a rotational driving force from a crankshaft to a transmission shaft is provided in the course of transmission of the driving force. The clutch has a plurality of frictional disks, and the rotational driving force of the crankshaft is transmitted to the transmission shaft by pressing the frictional disks against to each other. Furthermore, the system includes a cam mechanism for reducing a back torque by relaxing the pressing force on the frictional disks when the rotational driving force from the crankshaft increases (refer to, for example, FIG. 1 of Japanese Patent Laid-open No. 2005-325993). The contents of Japanese Patent Laid-open No. 2005-325993 are incorporated herein by reference in their entirety.

However, with only the cam mechanism as disclosed in Japanese Patent Laid-open No. 2005-325993, the operation of the cam mechanism may be accompanied by generation of a sound due to contact or collisions between metallic component parts.

SUMMARY OF THE INVENTION

According to one aspect of the present invention, a multiple disk clutch includes a clutch outer, a clutch inner, frictional disks, a cam mechanism, and a vibration isolating member. A rotational driving force is configured to be transmitted from a crankshaft to the clutch outer. The clutch inner is provided inside the clutch outer and configured to transmit the rotational driving force to a transmission shaft. The frictional disks are provided between the clutch outer and the clutch inner which is configured to receive the rotational driving force from the clutch outer through the frictional disks. The frictional disks are movable in an axial direction of the transmission shaft to thereby make and break transmission of the rotational driving force from the clutch outer to the clutch inner. The cam mechanism is provided inside the clutch outer and configured to apply a pressing force to the frictional disks according to the rotational driving force from the crankshaft. The cam mechanism is configured to relax the pressing force applied to the frictional disks when a load from the transmission shaft exceeds a predetermined value. The vibration isolating member is provided at the clutch inner.

According to another aspect of the present invention, a multiple disk clutch include a clutch outer, a clutch inner, frictional disks, a cam mechanism, and a vibration isolating member. A rotational driving force is configured to be transmitted from a crankshaft; to the clutch outer. The clutch inner is provided inside the clutch outer and configured to transmit the rotational driving force to a transmission shaft. The frictional disks are provided between the clutch outer and the clutch inner which is configured to receive the rotational driving force from the clutch outer through the frictional disks. The frictional disks are movable in an axial direction of the transmission shaft to thereby make and break transmission of the rotational driving force from the clutch outer to the clutch inner. The cam mechanism is provided inside the clutch inner and configured to apply a pressing force to the frictional disks according to the rotational driving force from the crankshaft. The cam mechanism is configured to relax the pressing force applied to the frictional disks when a load from the transmission shaft exceeds a predetermined value. The vibration isolating member is provided at the cam mechanism.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 10 is a left side view of the second cam plate 17;

FIG. 11 is a left side view of a third cam plate 18;

FIG. 12 is a sectional view taken along line XII-XII of FIG. 11;

FIG. 13 is a sectional view taken along line XIII-XIII of FIG. 11;

DESCRIPTION OF THE EMBODIMENTS

Figure 1:
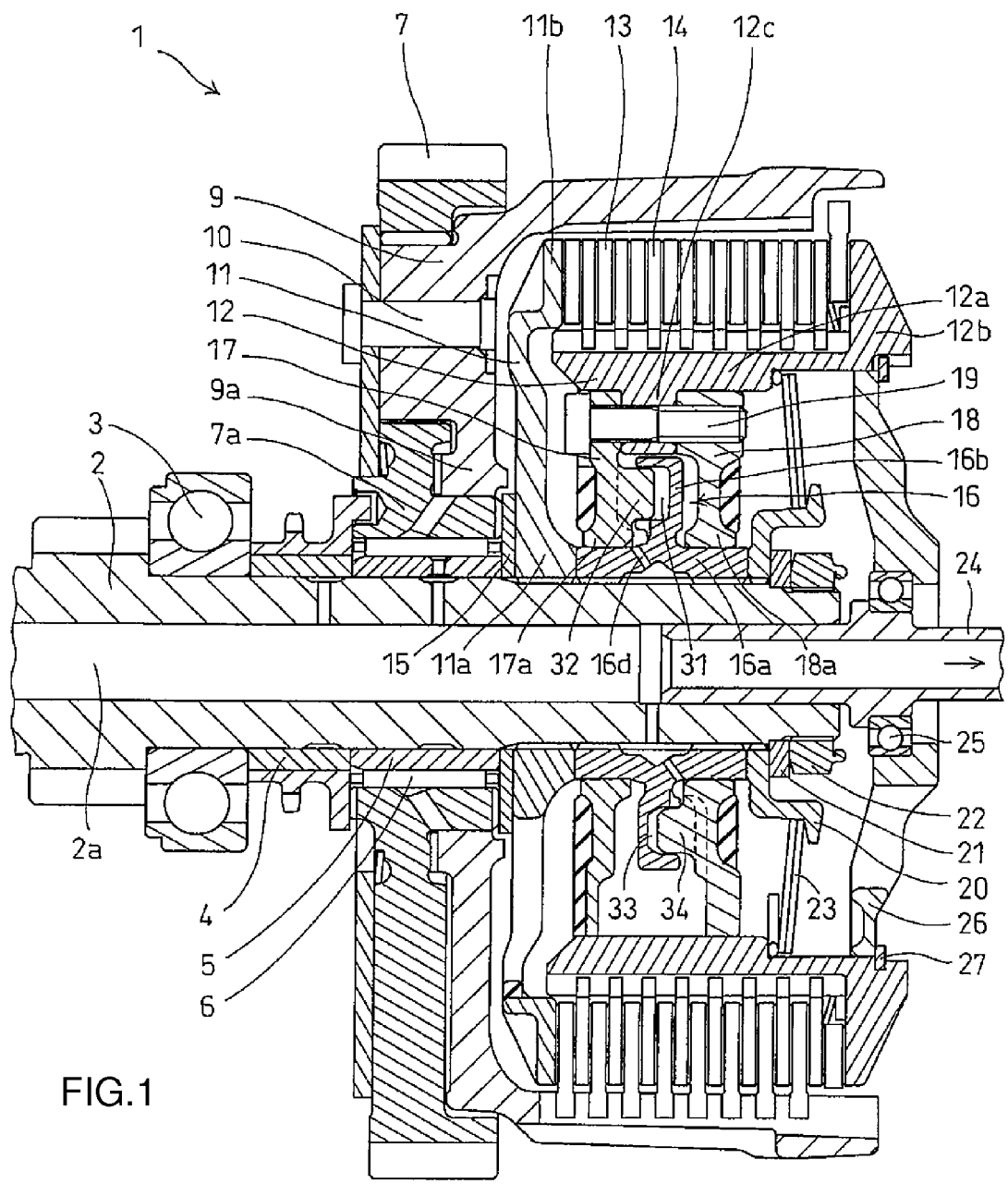
FIG. 1 is a longitudinal sectional view of a multiple disk clutch 1 according to an embodiment of the present invention.

The embodiments will now be described with reference to the accompanying drawings, wherein like reference numerals designate corresponding or identical elements throughout the various drawings.

FIG. 1 is a longitudinal sectional view of a multiple disk clutch 1 according to an embodiment of the present invention. The clutch is disposed on a rotational power transmission route extending from a crankshaft of an internal combustion engine in a vehicle such as a motorcycle toward a main shaft of a transmission, and is connected and disconnected according to the speed change operations conducted by the driver.

In the figure, a transmission main shaft 2 is rotatably supported on a crankcase (not shown) through a ball bearing 3. Adjacently to the ball bearing 3, the transmission main shaft 2 is provided with a sleeve 4 and a sleeve 5, and a driven gear 7 constantly meshed with a drive gear on a crankshaft is supported on the outer periphery of the sleeve 5 through a needle bearing 6 in such a manner as to be rotatable relative to the transmission main shaft 2. A boss part 9a of a clutch outer 9 of the multiple disk clutch 1 is held on the outer periphery of a boss part 7a of the driven gear 7, and the clutch outer 9 is connected by rivet 10 so as to be rotated as one body with the driven gear 7.

On the inner side of the clutch outer 9, a first clutch inner 11 is disposed adjacently to the boss part 7a of the driven gear 7, with an annular spacer 15 therebetween. The first clutch inner 11 has a boss part 11a and an outer peripheral annular part 11b. The boss part 11a of the first clutch inner 11 is supported on the transmission main shaft 2 through spline fit. A second clutch inner 12 is provided on the inner side of the clutch outer 2. The second clutch inner 12 integrally has a tubular part 12a, and an annular end part 12b at the right end of the tubular part 12a in FIG. 1.

The clutch outer 9 is provided with a plurality of drive frictional disks 13 which are engaged with the clutch outer 9 so as to be mutually non-rotatable and axially movable relative to the clutch outer 9. The second clutch inner 12 is provided with a plurality of driven frictional disks 14 which are engaged with the second clutch inner 12 so as to be mutually non-rotatable and axially movable relative to the second clutch inner 12. The drive frictional disks 13 and the driven frictional disks 14 are arranged alternately with each other. The annular outer peripheral part 11b of the first clutch inner 11 is in contact with the left end one, in FIG. 1, of the plurality of frictional disks. The annular end part 12b of the second clutch inner 12 is in contact with the right end one, in FIG. 1, of the plurality of frictional disks.

Adjacently to the boss part 11a of the first clutch inner 11, a boss part 16a of a first cam plate 16 is supported on the transmission main shaft 2 through spline fit. The first cam plate 16 has an extension part 16b extending outwards in the radial direction of the main shaft 2, and is provided on both surfaces of the extension part 16b with a cam mechanism.

A second cam plate 17 and a third cam plate 18 in pair are fixed, through bolts 19, to an inner projected part 12c provided at the inner periphery of the tubular part 12a of the second clutch inner 12, at such positions as to locate the extension part 16b of the first cam plate 16 therebetween in the axial direction. A boss part 17a of the second cam plate 17 and a boss part 18a of the third cam plate 18 are axially slidably engaged with the outer periphery of the boss part 16a of the first cam plate 16. In the just-mentioned configuration, the second clutch inner 12 and the second cam plate 17 and the third cam plate 18 can integrally be moved slightly in the axial direction on both sides of the extension part 16b of the first cam plate 16. The second cam plate 17 and the third cam plate 18 are provided with cam mechanisms at their surfaces facing the extension part 16b of the first cam plate 16.

Adjacently to the boss part 16a of the first cam plate 16, a spring receiving member 20 is engaged with the main shaft 2 through spline fit. A washer 21 and a nut 22 are provided adjacently to the spring receiving member 20 so that the first clutch inner 11, the first cam plate 16, and the spring receiving member 20 are fixed to be non-movable in the axial direction. A Belleville spring 23 is interposed between the second clutch inner 12 and the spring receiving member 20, whereby the second clutch inner 12 and the annular end part 12b integral therewith are pushed toward the first clutch inner 11. This ensures that the plurality of frictional disks 13, 14 are pressed against each other between the annular end part 12b of the second clutch inner 12 and the annular outer peripheral part 11b of the first clutch inner 11. This condition is a clutch connection condition at the time when the internal combustion engine is stopped and during normal operation of the engine.

An operating rod 24 is fitted in an end part of a central hole 2a in the main shaft 2. A clutch lifer 26 is held on an outer peripheral part of the operating rod 24 through a ball bearing 25, and the outer periphery of the clutch lifter 26 is engaged with a stop ring 27 attached to the inner periphery of the second clutch inner 12. At the time of disconnecting the clutch, the operating rod 24 is pulled rightwards in FIG. 1 against an urging force of the Belleville spring 23 so as to move the second clutch inner 12 rightwards, thereby separating the frictional disks 13, 14 from each other.

In FIG. 1, an assist cam mechanism is formed between the first cam plate 16 and the second cam plate 17. This is a mechanism which includes an assist recessed cam 31 provided in the first cam plate 16 and an assist projected cam 32 provided on the second cam plate 17.

In addition, a slipper cam mechanism is formed between the first cam plate 16 and the third cam plate 18. This is a mechanism which includes a slipper recessed cam 33 provided in the first cam plate 16 and a slipper projected cam 34 provided on the third cam plate 18.

The boss part 16a of the first cam plate 16 is formed with an oil hole 16d. This makes it possible to lubricate the cam mechanisms by supplying an oil from the central hole 2a in the transmission main shaft 2 into a space surrounded by the first cam plate 16, the second cam plate 17, the third cam plate 18, and the second clutch inner 12.

Figure 2:
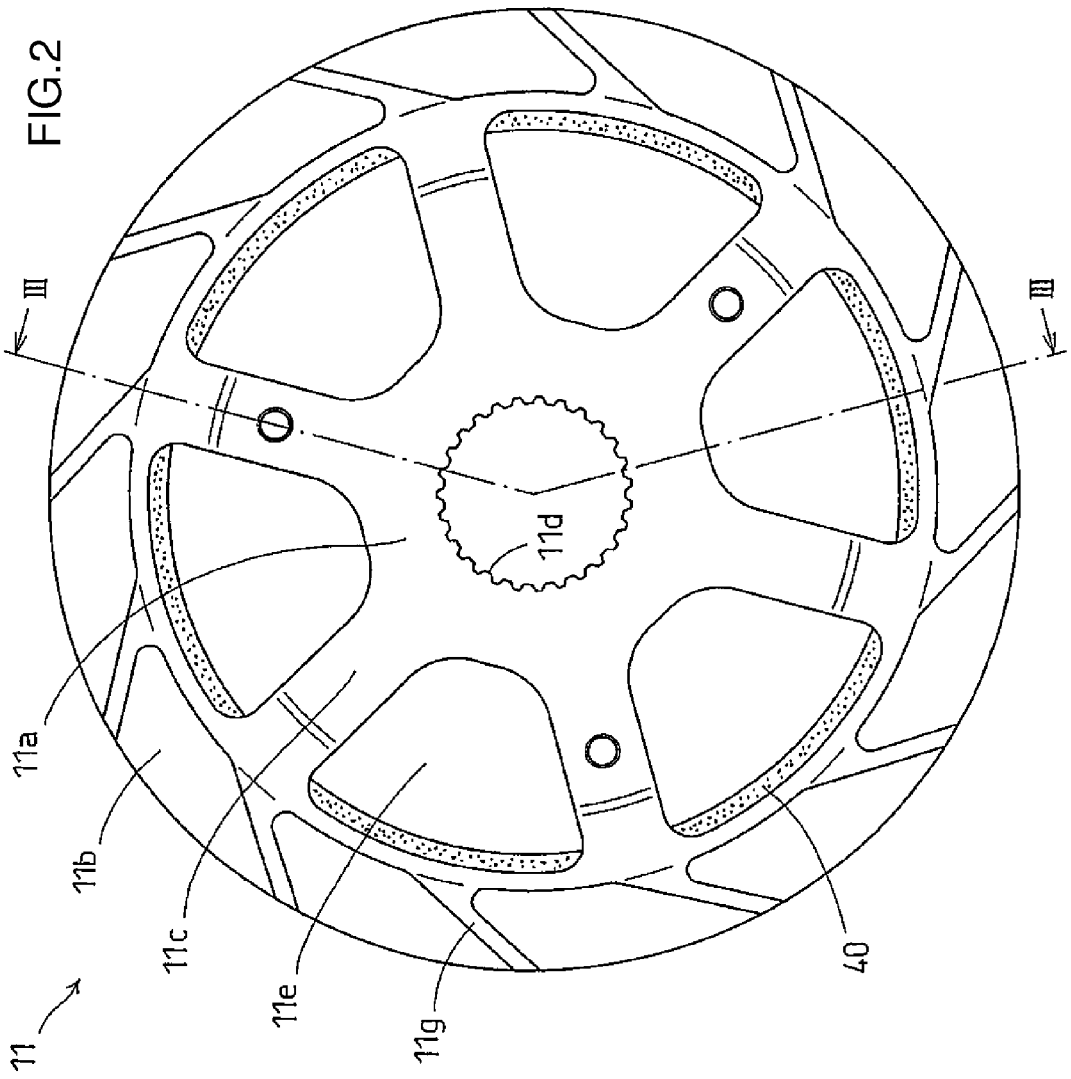
FIG. 2 is a left side view of a first clutch inner 1.
Figure 3:
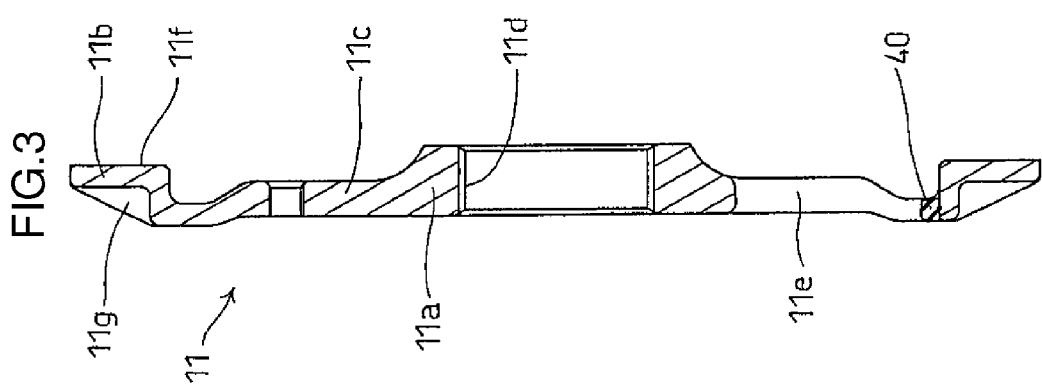
FIG. 3 is a sectional view taken along line III-III of FIG. 2.

FIGS. 2 and 3 show the first clutch inner 11, wherein FIG. 2 is a left side view of the first clutch inner 11, and FIG. 3 is a sectional view taken along line III-III of FIG. 2. Herein the surfaces of members are expressed by the terms of right surfaces and left surfaces, which are expressions based on the left and right sides in FIG. 1 in the condition where the members are disposed at their positions in FIG. 1. The first clutch inner 11 is a steel-made member having an integral structure included of the boss part 11a, the annular outer peripheral part 11b, and connecting parts 11c connecting the parts 11a, 11b to each other. The boss part 11a is provided in its inner periphery with a spline 11d, whereby the boss part 11a is fitted over the transmission main shaft 2 in a mutually non-rotatable manner. Since the steel-made part is an integral part, providing this part with lightening holes 11e results in formation of the connecting parts 11c extending radially from the boss part 11a. A surface of the annular outer peripheral part 11b is a pressure receiving surface 11f, and the surface on the opposite side is formed with projected parts 11g constituting vanes of a fan. Vibration isolating rubber members 40 are adhered to the inner side of the annular outer peripheral part 11b, specifically, those parts of the inner peripheral parts of the lightening holes 11e which are the nearest to the annular outer peripheral part 11b. The vibration isolating rubber members 40 are adhered by vulcanizing molding.

Figure 4:
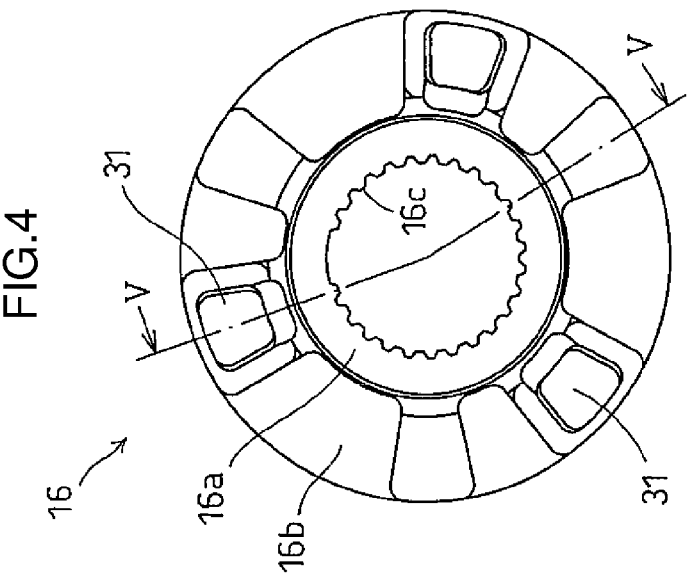
FIG. 4 is a left side view of a first cam plate 16.
Figure 5:
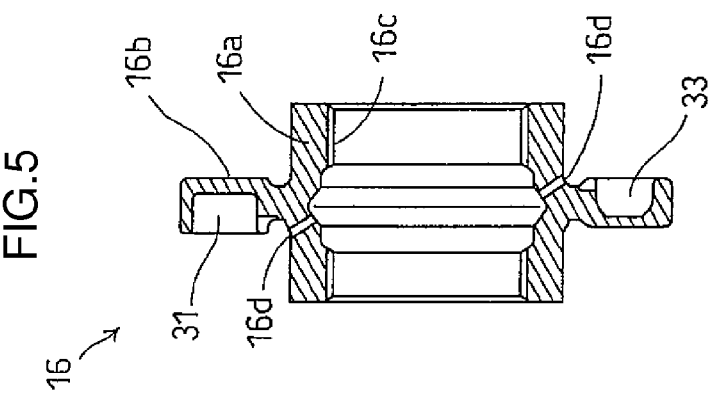
FIG. 5 is a sectional view taken along line V-V of FIG. 4.
Figure 6:
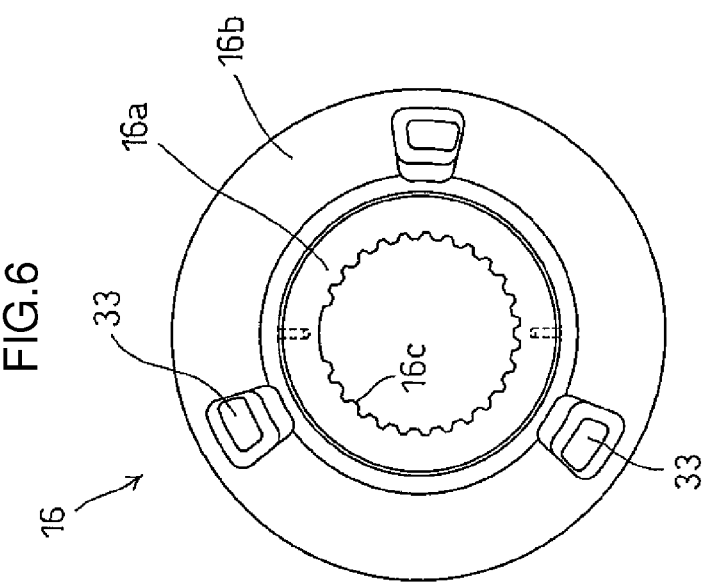
FIG. 6 is a right side view of the first cam plate 16.

FIGS. 4 to 6 show the first cam plate 16, wherein FIG. 4 is a left side view of the first cam plate 16, FIG. 5 is a sectional view taken along line V-V of FIG. 4, and FIG. 6 is a right side view of the first cam plate 16. The first cam plate 16 includes the boss part 16a, and an outer extension part 16b extending radially outwards from the boss part 16a. The boss part 16a is provided with splines 16c in the inner periphery thereof, and is thereby fitted over the transmission main shaft 2 in a mutually non-rotatable manner. The left surface of the outer extension part is formed with three assist recessed cams 31, and the right surface of the outer extension part is formed with three slipper recessed cams 33. Namely, the first cam plate 16 is a member which is provided with the recessed cams in both surfaces thereof. The boss part 16a is formed therein with oil holes 16d for lubricating the cam parts.

Figure 7:
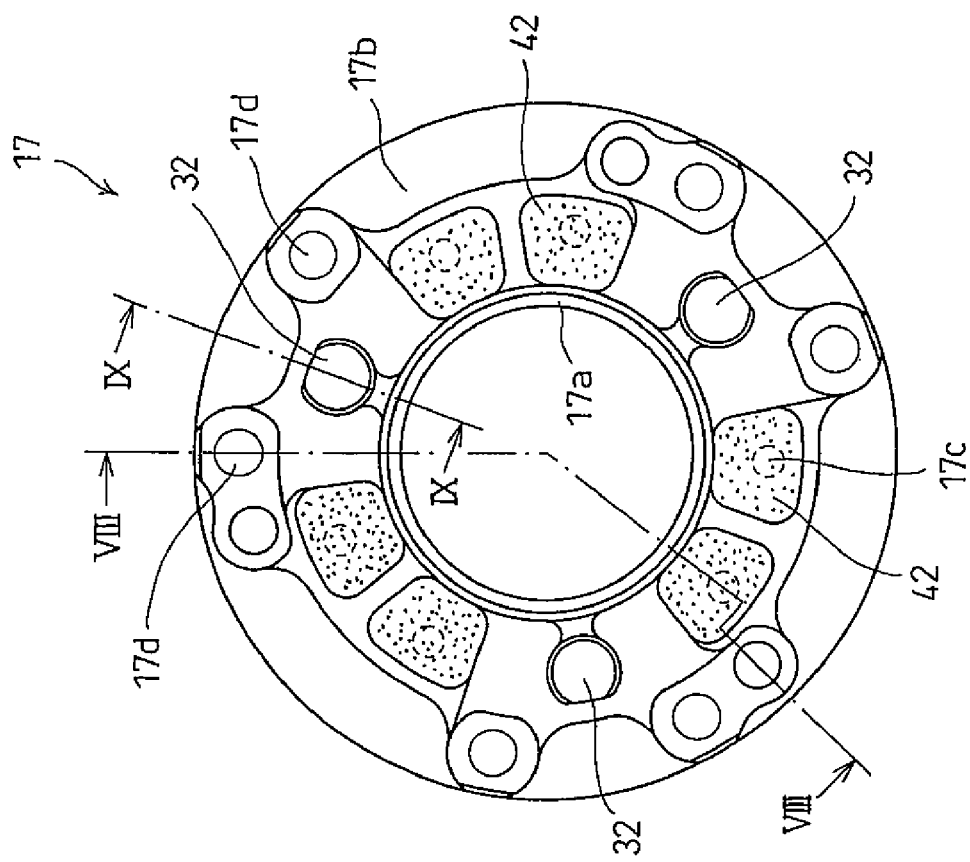
FIG. 7 is a right side view of a second cam plate 17.
Figure 8:
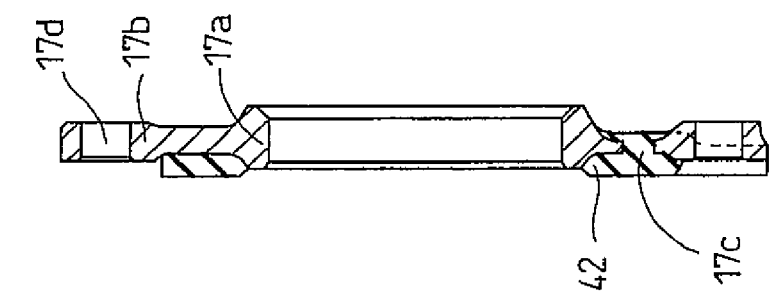
FIG. 8 is a sectional view taken along line VIII-VIII of FIG. 7.
Figure 9:
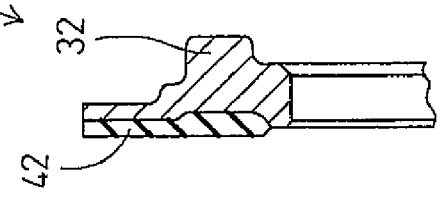
FIG. 9 is a sectional view taken along line IX-IX of FIG. 7.

FIGS. 7 to 10 show the second cam plate 17, wherein FIG. 7 is a right side view of the second cam plate 17, FIG. 8 is a sectional view taken along line VIII-VIII of FIG. 7, FIG. 9 is a sectional view taken along line IX-IX of FIG. 7, and FIG. 10 is a left side view of the second cam plate 17. The second cam plate 17 includes the boss part 17a, and an outer extension part 17b extending radially outwards from the boss part 17a. The inner surface of the boss part 17a is fitted over the outer surface of the boss part 16a of the first cam plate 16, and is slid in the axial direction. The outer extension part 17b is provided with three assist projected cams 32, which are engaged with the assist recessed cams 31 of the first cam plate 16. A vibration isolating rubber members 42 is adhered to substantially the whole area of the left surface (FIG. 10) of the outer extension part of the second cam plate 17, whereas a vibration isolating rubber member 42 is adhered to the partial right surface (FIG. 7) of the outer extension part. The vibration isolating rubber member 42 is adhered by vulcanization molding. The rubber members 42 on both surfaces are integrally connected to each other by way of through holes 17c (FIG. 8) provided in the outer extension part. This prevents the rubber member 42 from coming out of position or peeling off. The outer extension part 17b of the second cam plate 17 is provided with bolt passing holes 17d at six positions. These are holes through which to pass the bolts 19 for mounting the second cam plate 17 onto the inner projected part 12c of the second clutch inner 12, as shown in FIG. 1.

Figure 14:
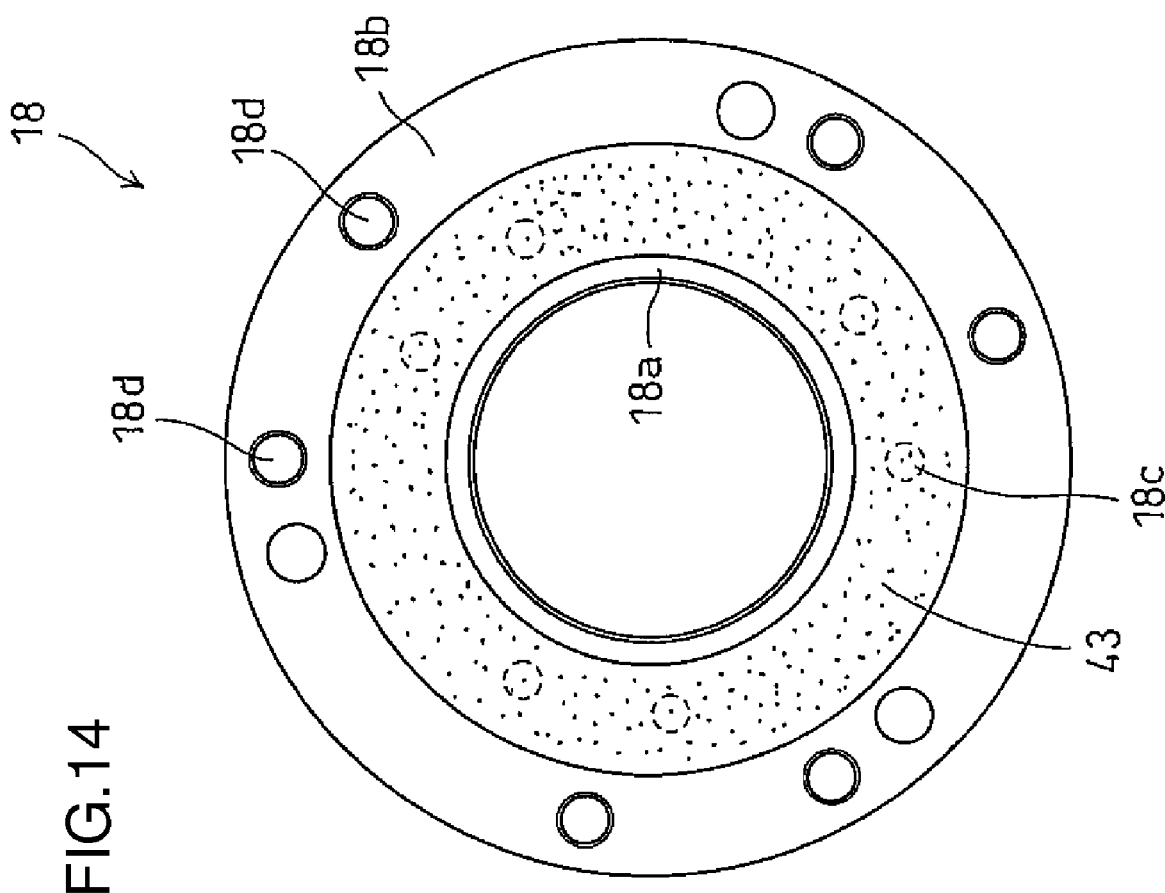
FIG. 14 is a right side view of the third cam plate 18.

FIGS. 11 to 14 show the third cam plate 18, wherein FIG. 11 is a left side view of the third cam plate 18, FIG. 12 is a sectional view taken along line XII-XII of FIG. 11, FIG. 13 is a sectional view taken along line XIII-XIII of FIG. 11, and FIG. 14 is a right side view of the third cam plate 18. The third cam plate 18 includes the boss part 18a, and an outer extension part 18b extending radially outwards from the boss part 18a. The inner surface of the boss part 18a is fitted over the outer surface of the boss part 16a of the first cam plate 16, and is slid in the axial direction. The outer extension part 18b is provided with three slipper projected cams 34, which are engaged with the slipper recessed cams 33 of the first cam plate 16. A vibration isolating rubber member 43 is adhered to the right surface (FIG. 14) of the outer extension part 18b of the third cam plate 18, whereas a vibration isolating rubber member 43 is adhered to the partial left surface (FIG. 11) of the outer extension part 18b. The vibration isolating rubber member 43 is adhered by vulcanization molding. The rubber members 43 on both surfaces are integrally connected to each other by way of through holes 18c (FIG. 13) provided in the outer extension part 18b. This prevents the rubber member 43 from coming out of position or peeling off. The outer extension part 18b of the third cam plate 18 is provide with bolt screw engaging screw holes 18d at six positions. These are screw holes with which to screw engage the bolts 19 for attaching the third cam plate 18 to the inner projected part 12c of the second clutch inner 12, as shown in FIG. 1.

Figure 15:
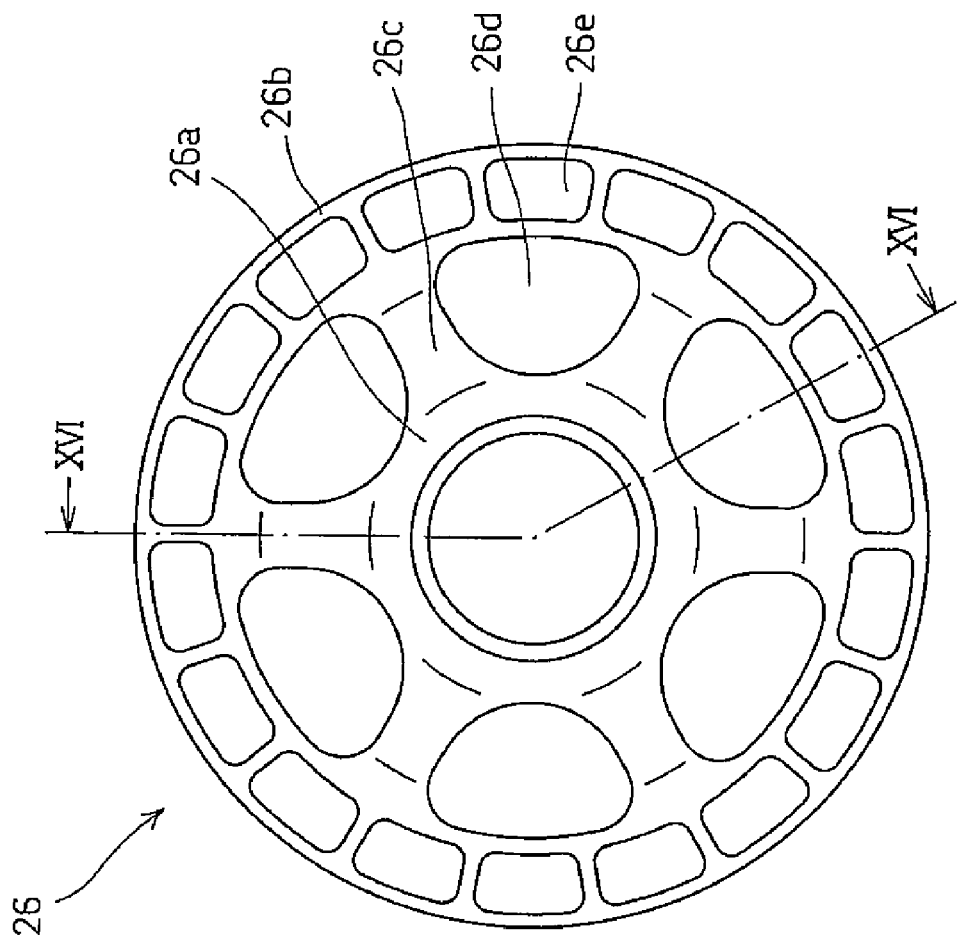
FIG. 15 is a left side view of a clutch lifter 26.
Figure 16:
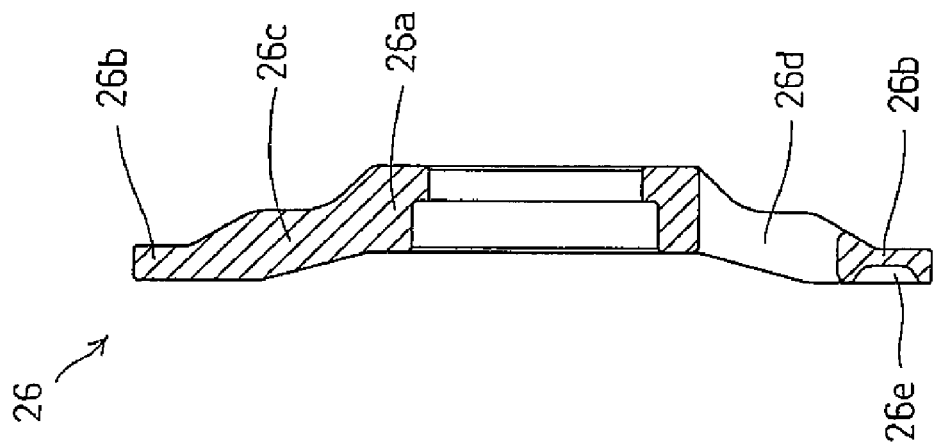
FIG. 16 is a sectional view taken along line XVI-XVI of FIG. 15.

FIGS. 15 and 16 show the clutch lifter 26, wherein FIG. 15 is a left side view of the clutch lifter 26, and FIG. 16 is a sectional view taken along line XVI-XVI of FIG. 15. The clutch lifer 26 is a steel-made member having an integral structure included of a boss part 26a, an annular outer peripheral part 26b, and connecting parts 26c connecting the parts 26a, 26b to each other. The member is formed with lightening holes 26d, whereby the connecting parts 26c extending radially from the boss part 26a are formed. The annular outer peripheral part 26b is formed with recessed parts 26e for lightening in weight. The boss part 26a of the clutch lifter 26 is supported on the operating rod 24 through the ball bearing 25 (FIG. 1).

Figure 17:
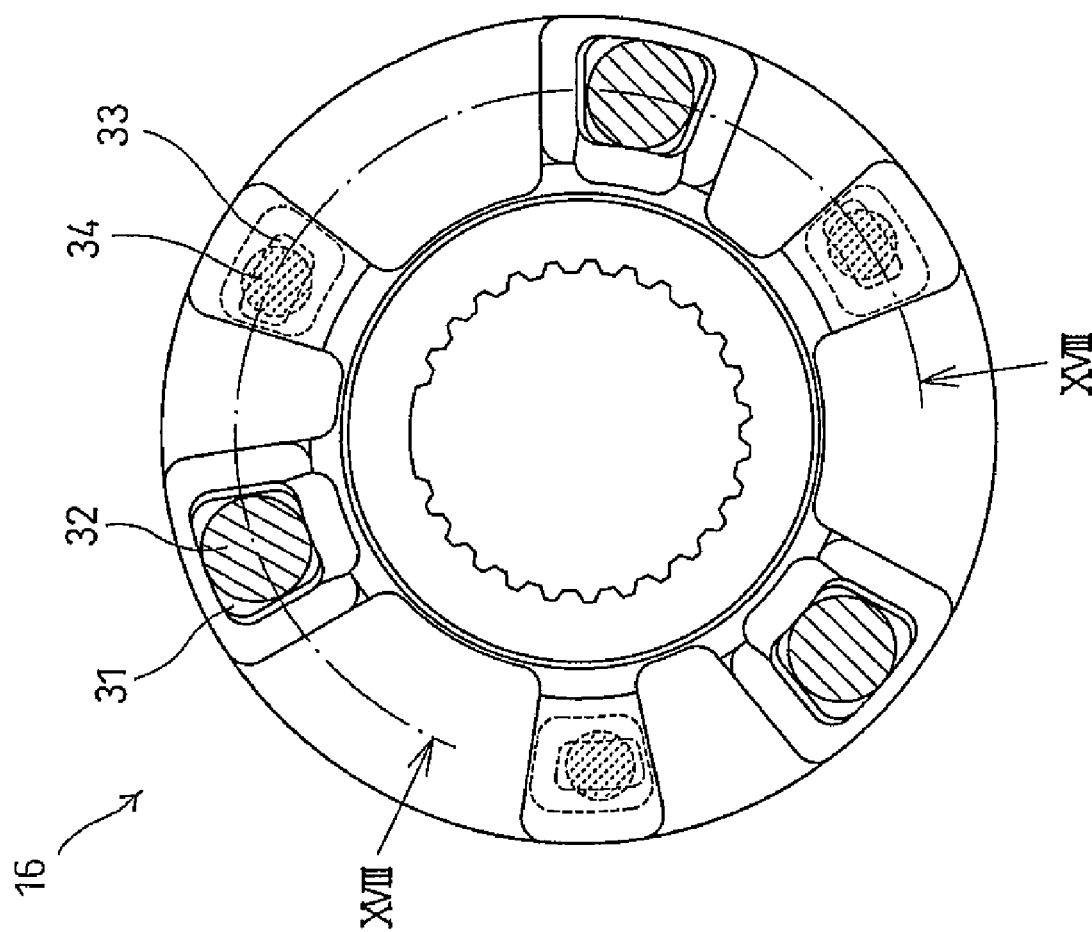
FIG. 17 is an enlarged view of the left surface of the first cam plate 16.

FIG. 17 is an enlarged view of a left surface of the first cam plate 16, i.e., a surface formed with the assist recessed cams 31. The cross sections of the assist projected cams 32 engaged with the recessed cams 31 are also shown in the figure. The slipper recessed cams 33 formed in the surface on the opposite side and the slipper projected cams 34 engaged therewith are represented in broken lines.

Figure 18:
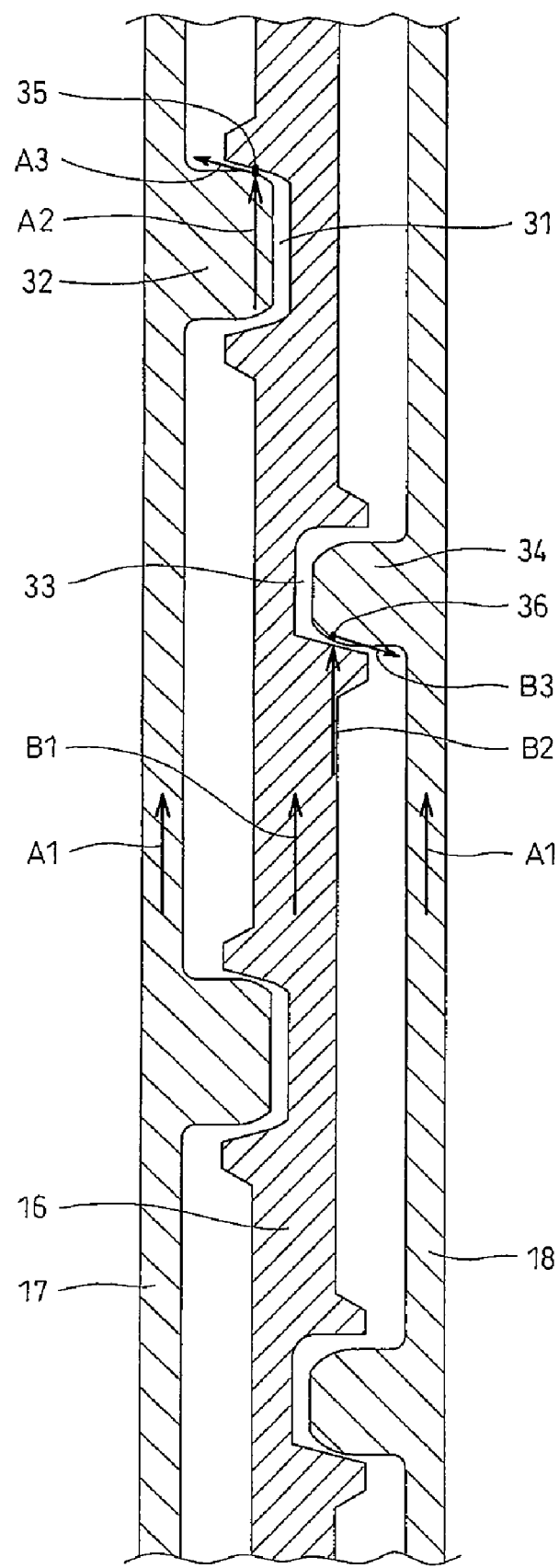
FIG. 18 is a sectional development taken along line XVIII-XVIII of FIG. 17.

FIG. 18 is a sectional development taken along line XVIII-XVIII of FIG. 17. In the figure, on both sides of the first cam plate 16 in the center, the second cam plate 17 and the third cam plate 18 can integrally be slightly moved in the vertical and left-right directions relative to the first cam plate 16.

In FIG. 1, during when the internal combustion engine is stopped, the Belleville spring 23 is pushing the second clutch inner 12, so that the drive frictional disks 13 and the driven frictional disks 14 are pressed against to each other between the annular end part 12b of the second clutch inner 12 and the annular outer peripheral part 11b of the first clutch inner 11. When a driving torque is input from the internal combustion engine to the multiple disk clutch 1 through the driven gear 7, the clutch outer 9 is rotated, whereby the drive frictional disks 13 engaged with the clutch outer 9, the driven frictional disks 14 pressed against the drive frictional disks 13, the second clutch inner 12 engaged with the driven frictional disks 14, and the second cam plate 17 and the third cam plate 18 which are fastened to the second clutch inner 12 by the bolts 19 are rotated together.

When the just-mentioned rotation is started, a driving torque A1 is exerted on the second cam plate 17 and the third cam plate 18 being rotated integrally as above-mentioned, as shown in FIG. 18. This results in that the assist projected cams 32 formed on the second cam plate 17 are moved in the same direction as the driving torque to make contact with opposite points 35 on slant surfaces on one side of peripheral edge parts of the assist recessed cams 31, and press the first cam plate 16 by pushing forces A2 corresponding to the driving torque A1, thereby transmitting the driving torque A1. As a result, the first cam plate 16 is also driven by the driving torque A1. The driving torque A1 is transmitted to the transmission main shaft 2 engaged with the first cam plate 16 through spline fit, whereby the transmission main shaft 2 is also rotated by the driving torque A1. The foregoing is the mechanism of transmission of the rotational driving force during normal operation.

When the pushing forces A2 exerted on the opposite points 35 on the assist recessed cams 31 by the assist projected cams 32 increase attendant on an increase in the driving torque A1 input from the internal combustion engine to the multiple disk clutch 1 through the driven gear 7, the assist projected cams 32 themselves are pushed in the slant surfaces direction by the components A3 in the slant surface direction of the pushing forces A2, so that the second cam plate 17 is moved in the direction of the components A3 along the slant surfaces. In this instance, the third cam plate 18 is also moved together. This movement is transmitted to the second clutch inner 12 (FIG. 1) integrally fastened by the bolts 19, whereby the second clutch inner 12 and the annular end part 12a integral therewith are pushed in the direction of pressing the frictional disks 13, 14 against each other. The moving amount of the second cam plate 17 is determined by the balance between the pressing force exerted from the frictional disks and a reaction force thereof. Specifically, according to the magnitude of the driving torque A1 from the internal combustion engine, the second cam plate 17 is moved in the direction of the slant surfaces of the assist recessed cams 31, to move the annular end part 12a in the direction for assisting the pressing force on the frictional disks, thereby transmitting an increased driving torque.

In FIG. 18, arrow B1 indicates the direction of a back torque. When the back torque B1 transmitted from the transmission main shaft 2 exceeds the driving torque A1, the slipper recessed cams 33 are moved in the same direction as the back torque B1 relative to the slipper projected cams 34, the slant surfaces on one side of the peripheral edge parts of the slipper recessed cams 33 come into contact with opposite points 36 on the slipper projected cams 34, to push the third cam plate 18 through the slipper projected cams 34 by pushing forces B2 corresponding to the back torque B1.

When the back torque B1 increases and the pushing forces B2 exerted on the opposite points 36 on the slipper projected cams 34 by the peripheral edge parts of the slipper recessed cams 33 increase, the third cam plate 18 is moved along the slant surfaces in the direction of the components B3 in the slant surface direction of the reaction forces of the pushing forces B2 by the components B3 of the reaction forces. In this instance, the second cam plate 17 is also moved together. This movement is transmitted to the second clutch inner 12 integrally fastened by the bolts 19, thereby pushing the second clutch inner 12 and the annular end part 12a integral therewith in the direction for separating the frictional disks 13, 14 from each other. Specifically, when the back torque B1 from the transmission main shaft 2 exceeds the driving torque A1, the second cam plate 17 and the third cam plate 18 are moved, to reduce the pressing force exerted on the frictional disks by the annular end part 12a, whereby the frictional disks are slid. This ensures that the slipper cam mechanism reduces the torque being transmitted, thereby to function as a back torque limiter, and to lighten the reverse input torque at the time of deceleration, thereby moderating the engine brake, so that the load on the driving system can be reduced.

While an example in which the rubber members are used as the vibration isolating members has been described in the embodiment above, the vibration isolating member is not limited to the rubber member; for example, the vibration isolating member may be a resin-made member, a metal-made member or a composite member thereof. Besides, the method of attaching the vibration isolating member is not limited to the method shown in the above embodiment; for example, baking, bolt fastening or the like may be adopted as the attaching method.

As has been described in detail above, in the embodiment of the present invention, the following effects are obtained.

(1) With the clutch inner provided with the vibration isolating members, the metal collision sounds generated in the cam mechanism can be prevented from resonating in the clutch inner, and suppression of sounds can be contrived.

(2) Since the second clutch inner 12 is engaged with the driven frictional disk 14, it is less liable to be resonated with the metal collision sounds generated from the cam mechanism, and, since the cam mechanism is provided on the radially inner side of the second clutch inner 12, the metal collision sounds can be made less liable to leak to the exterior. In addition, with the first clutch inner 11 disposed adjacently being provided with the vibration isolating member, the metal collision sounds generated in the cam mechanism can be prevented from resonating in the first clutch inner 11, and suppression of sounds can be contrived.

(3) With the first clutch inner 11 provided with the lightening holes and with the vibration members provided at inner peripheries of the lightening holes, vibration isolating can be achieved while preventing the clutch from being enlarged in size in the axial direction. Further, the lightening makes it possible to contrive a reduction in weight notwithstanding the vibration isolating members are provided.

(4) Since the annular outer peripheral part 11b of the first clutch inner 11 is in contact with the frictional disk, it is less liable to be resonated with the metal collision sounds generated from the cam mechanism, but the portion located on the inner side of the annular outer peripheral part and remote from the transmission shaft is liable to be resonated. In view of this, the vibration isolating member is provided on the side of the portion located on the inner side of the annular outer peripheral part 11b and remote from the transmission shaft, whereby resonation can be restrained, and generation of large metallic sounds can be suppressed.

(5) With the cam mechanism provided with the vibration isolating member, it is possible to prevent metallic sounds from being additionally generated at the cam mechanism with the result of larger metallic sounds.

(6) If the vibration isolating members are provided on the surface provided with the cam parts, not only the projection amounts of the projected parts engaged with the recessed parts would be enlarged by amounts corresponding to the vibration isolating members, but also the projected parts would be enlarged so as to secure the rigidity of the projected parts, accompanied by enlargement of the recessed parts also, so that each of the cam plates would be enlarged in size. In view of this, the vibration isolating member is provided over a broad area on the surface on the opposite side of the surface provided with the cams, whereby the projected cams can be prevented from becoming large, and the cam mechanism can be prevented from being enlarged in size.

(7) Since the fan is provided at the annular outer peripheral part of the first clutch inner 11, air can flow from the lightening holes toward the fan, air inside the clutch inner can be made to flow to the exterior, and accumulation of heat inside the clutch inner can be prevented. In addition, since flow of air is promoted, the frictional disk cooling performance is enhanced. Besides, since the annular outer peripheral part is provided with the projected parts (which constitute the vanes of the fan) at positions corresponding to the lightening holes, the rigidity of the annular outer peripheral part can be enhanced. Since the rigidity of the annular outer peripheral part is thus enhanced, the lightening holes can be made broader. This makes it possible to achieve a reduction in weight of the first clutch inner 11 while providing the fan. In addition, the quantity of air being circulated can be enlarged.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A multiple disk clutch comprising:
   a clutch outer to which a rotational driving force is configured to be transmitted from a crankshaft;
   a clutch inner provided inside said clutch outer and configured to transmit the rotational driving force to a transmission shaft;
   frictional disks provided between said clutch outer and said clutch inner which is configured to receive the rotational driving force from said clutch outer through said frictional disks, said frictional disks being movable in an axial direction of the transmission shaft to thereby make and break transmission of the rotational driving force from said clutch outer to said clutch inner;
   a cam mechanism provided inside said clutch outer and configured to apply a pressing force to said frictional disks according to the rotational driving force from said crankshaft, said cam mechanism being configured to relax the pressing force applied to said frictional disks when a load from said transmission shaft exceeds a predetermined value; and a vibration isolating member provided at said clutch inner, wherein said first clutch inner is provided with a plurality of lightening holes that extend axially, entirely through said first clutch inner, and wherein the vibration isolating member is provided at an inner periphery of at least one of said lightening holes.

2. The multiple disk clutch as set forth in claim 1, further comprising:
an additional vibration isolating member provided at said cam mechanism.

3. The multiple disk clutch as set forth in claim 1, wherein the presence of said lightening holes makes said first clutch inner have a shape in which a boss part and an annular outer peripheral part are connected to each other through connecting parts, one-side surface of said annular outer peripheral part is made to be a pressure receiving surface, a fan is formed on a surface of said annular outer peripheral part on the opposite side of said pressure receiving surface, and at least one projected part constituting a vane of said fan is provided at that part of said annular outer peripheral part which is adjacent to said lightening hole.

4. The multiple disk clutch as set forth in claim 1, wherein each of the inner peripheral parts of said lightening holes is provided with said vibration isolating member on a radially outermost side with respect to said first clutch inner.

5. The multiple disk clutch as set forth in claim 1, wherein said frictional disks comprise
a drive frictional disk disposed to be movable in the axial direction and not to be relatively rotatable with respect to said clutch outer, and
a driven frictional disk disposed to be movable in the axial direction and not to be relatively rotatable with respect to said clutch inner and arranged alternately with said drive frictional disk;
said clutch inner comprises
a first clutch inner disposed not to be relatively rotatable and not to be movable in the axial direction with respect to said transmission shaft and provided with a pressure receiving part for pressing said frictional disks against each other, and
a second clutch inner engaged with said driven frictional disk and being movable in a direction of said transmission shaft so as to press or separate said frictional disks against or from each other, the second clutch inner being provided with a pressing part to push said clutch disks in the axial direction so as to press said clutch disks against each other between itself and said pressure receiving part of said first clutch inner; and
said cam mechanism is disposed on the radially inner side of said second clutch inner and adjacently to said first clutch inner, said first clutch inner being provided with a vibration isolating member.

6. The multiple disk clutch as set forth in claim 5, wherein said plurality of lightening holes are provided on the radially inner side relative to said pressure receiving part thereof.

7. The multiple disk clutch as set forth in claim 6, wherein each of the inner peripheral parts of said lightening holes is provided with said vibration isolating member on a radially outermost side with respect to said first clutch inner.

8. The multiple disk clutch as set forth in claim 6, wherein the presence of said lightening holes makes said first clutch inner have a shape in which a boss part and an annular outer peripheral part are connected to each other through connecting parts, one-side surface of said annular outer peripheral part is made to be a pressure receiving surface, a fan is formed on a surface of said annular outer peripheral part on the opposite side of said pressure receiving surface, and at least one projected part constituting a vane of said fan is provided at that part of said annular outer peripheral part which is adjacent to said lightening hole.

9. A multiple disk clutch comprising:
a clutch outer to which a rotational driving force is configured to be transmitted from a crankshaft;
a clutch inner provided inside said clutch outer and configured to transmit the rotational driving force to a transmission shaft;
frictional disks provided between said clutch outer and said clutch inner which is configured to receive the rotational driving force from said clutch outer through said frictional disks, said frictional disks being movable in an axial direction of the transmission shaft to thereby make and break transmission of the rotational driving force from said clutch outer to said clutch inner;
a cam mechanism provided inside said clutch inner and configured to apply a pressing force to said frictional disks according to the rotational driving force from said crankshaft, said cam mechanism being configured to relax the pressing force applied to said frictional disks when a load from said transmission shaft exceeds a predetermined value; and
a vibration isolating member provided at said cam mechanism.

10. The multiple disk clutch as set forth in claim 9, wherein said cam mechanism comprises
a first cam plate disposed not to be relatively rotatable and not to be movable along an axial direction with respect to said transmission shaft and having an extension part extending radially outwards, the first cam plate including a cam part comprising a recessed part or a projected part provided on each of both surfaces of said extension part, and
a second and a third cam plate which are provided to be movable in the axial direction of said transmission shaft, locate said extension part of said first cam plate therebetween in the axial direction, and are provided in their surfaces facing said extension part with a cam part comprising a projected part or a recessed part so as to be engageable with said corresponding recessed part or said projected part respectively, provided in said first cam plate; and
each of said second and third cam plates is provided with a vibration isolating member on its surface on the opposite side of its surface provided with said cam part.

* * * * *